United States Patent
Zhdanov et al.

(10) Patent No.: US 10,489,802 B1
(45) Date of Patent: Nov. 26, 2019

(54) CLUSTER-BASED DEMAND FORECASTING PROCEDURE

(75) Inventors: Fedor Zhdanov, Seattle, WA (US); Kari E. J. Torkkola, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 784 days.

(21) Appl. No.: 13/524,897

(22) Filed: Jun. 15, 2012

(51) Int. Cl.
 *G06Q 30/02* (2012.01)

(52) U.S. Cl.
 CPC .............................. *G06Q 30/0202* (2013.01)

(58) Field of Classification Search
 USPC ........................................................ 705/7.31
 See application file for complete search history.

(56) References Cited

U.S. PATENT DOCUMENTS

| | | | |
|---|---|---|---|
| 5,963,919 A | 10/1999 | Brinkley et al. | |
| 6,341,269 B1 | 1/2002 | Dulaney et al. | |
| 6,976,001 B1 * | 12/2005 | Levanoni ............... | G06Q 10/06 705/7.31 |
| 7,257,544 B2 * | 8/2007 | Rose .................. | G06Q 10/0635 705/7.28 |
| 7,313,532 B2 | 12/2007 | Mariamova et al. | |
| 7,574,382 B1 | 8/2009 | Hubert | |
| 7,603,299 B1 | 10/2009 | Dewey, Jr. et al. | |
| 7,676,404 B2 | 3/2010 | Richard et al. | |
| 7,769,643 B2 | 8/2010 | Laughlin et al. | |
| 2001/0047293 A1 | 11/2001 | Waller et al. | |
| 2002/0019759 A1 | 2/2002 | Arunapuram et al. | |
| 2002/0178077 A1 | 11/2002 | Katz et al. | |
| 2003/0009410 A1 | 1/2003 | Ramankutty et al. | |
| 2003/0018513 A1 | 1/2003 | Hoffman et al. | |
| 2003/0033179 A1 | 2/2003 | Katz et al. | |
| 2003/0078850 A1 | 4/2003 | Hartman et al. | |
| 2003/0101107 A1 | 5/2003 | Agarwal et al. | |
| 2003/0145002 A1 * | 7/2003 | Kleinberger ......... | G06K 9/6215 |
| 2003/0149578 A1 | 8/2003 | Wong | |
| 2003/0195791 A1 | 10/2003 | Waller et al. | |
| 2003/0216969 A1 | 11/2003 | Bauer et al. | |
| 2004/0039664 A1 | 2/2004 | Natan et al. | |
| 2004/0172321 A1 | 9/2004 | Vemula et al. | |
| 2005/0033706 A1 | 2/2005 | Krikler et al. | |

(Continued)

OTHER PUBLICATIONS

Arabie, Phipps, J. Douglas Carroll, Wayne DeSarbo, and Jerry Wind. "Overlapping Clustering: A New Method for Product Positioning." Journal of Marketing Research 18 (Aug. 1981): 310-317.*

(Continued)

*Primary Examiner* — Jeff Zimmerman
(74) *Attorney, Agent, or Firm* — Robert C. Kowert; Meyertons, Hood, Kivlin, Kowert & Goetzel, P.C.

(57) ABSTRACT

Methods and systems for forecasting demand are described. A method may include determining a demand pattern for each respective item of at least some items of a plurality of items. The method may also include clustering the plurality of items into a plurality of clusters based on the determined demand patterns. The method may further include determining a composite demand pattern for each cluster. The method may additionally include forecasting a demand for an item of the plurality of items based on the composite demand pattern of the cluster to which the item belongs.

15 Claims, 6 Drawing Sheets

(56) References Cited

U.S. PATENT DOCUMENTS

| | | | |
|---|---|---|---|
| 2005/0097065 A1* | 5/2005 | Johnson | G06Q 10/06 |
| | | | 705/400 |
| 2005/0102272 A1* | 5/2005 | Kumar | G06Q 10/087 |
| 2006/0041481 A1 | 2/2006 | Stowe | |
| 2006/0282346 A1 | 12/2006 | Kernodle et al. | |
| 2007/0156510 A1* | 7/2007 | Kim | G06Q 10/04 |
| | | | 705/7.31 |
| 2007/0270990 A1 | 11/2007 | Katircioglu | |
| 2008/0015951 A1 | 1/2008 | Kerker et al. | |
| 2008/0133310 A1* | 6/2008 | Kim | G06O 30/02 |
| | | | 705/7.31 |
| 2008/0133313 A1* | 6/2008 | Bateni | G06Q 10/04 |
| | | | 705/7.31 |
| 2009/0089143 A1* | 4/2009 | Bateni | G06Q 30/02 |
| | | | 705/7.31 |
| 2009/0125375 A1* | 5/2009 | Bateni | G06Q 10/04 |
| | | | 705/7.31 |
| 2009/0125385 A1 | 5/2009 | Landvater | |
| 2009/0177520 A1* | 7/2009 | Bateni | G06F 16/26 |
| | | | 705/7.31 |
| 2010/0114554 A1* | 5/2010 | Misra | G06Q 10/00 |
| | | | 703/22 |
| 2010/0138273 A1* | 6/2010 | Bateni | G06Q 30/02 |
| | | | 705/7.31 |
| 2010/0138274 A1* | 6/2010 | Bateni | G06Q 10/04 |
| | | | 705/7.31 |
| 2010/0138275 A1* | 6/2010 | Bateni | G06Q 30/02 |
| | | | 705/7.31 |
| 2010/0169165 A1* | 7/2010 | Bateni | G06Q 30/02 |
| | | | 705/7.31 |
| 2010/0169166 A1* | 7/2010 | Bateni | G06Q 30/02 |
| | | | 705/7.31 |
| 2010/0235225 A1* | 9/2010 | Bateni | G06Q 30/02 |
| | | | 705/7.31 |
| 2011/0153385 A1* | 6/2011 | Bateni | G06Q 10/04 |
| | | | 705/7.31 |
| 2011/0153386 A1* | 6/2011 | Kim | G06Q 10/04 |
| | | | 705/7.31 |
| 2012/0054076 A1 | 3/2012 | Wu et al. | |
| 2012/0173304 A1 | 7/2012 | Hosoda et al. | |
| 2013/0166350 A1* | 6/2013 | Willemain | G06Q 30/0202 |
| | | | 705/7.31 |

OTHER PUBLICATIONS

Gensch, D.H., R.G. Javalgi, Issues and Advances in Product Positioning Models in Marketing Research, Mathl Comput Modelling, vol. 10, No. 12, pp. 929-949, 1988.*

Nan Niu, Steve Easterbrook, On-Demand Cluster Analysis for Product Line Functional Requirements, Software Product Line Conference, 2008. SPLC '08. 12th International, Sep. 8-12, 2008.*

Ana Lisa Amorim do Monte, Clustering for Decision Support in the Fashion Industry, Sep. 2012.*

U.S. Appl. No. 13/524,897, filed Jun. 15, 2012, Fedor Zhdanov, et al.

U.S. Appl. No. 13/172,726, filed Jun. 29, 2011, Jason W. Murray, et al.

U.S. Appl. No. 13/172,720, filed Jun. 29, 2011, Jason W. Murray.

\* cited by examiner

Composite Demand Patterns of Clusters for a Product Group

Refined Composite Demand Patterns for Seasonality

CLUSTER-BASED DEMAND FORECASTING PROCEDURE

BACKGROUND

To provide a wide selection of products that are readily available for delivery, many merchants (whether engaging in electronic or conventional "brick and mortar" commerce) may store those products in warehouses, fulfillment centers, or other inventory facilities. Keeping items in inventory may provide numerous benefits, such as, for example, accommodating variations in customer demand and/or a manufacturer or distributor's ability to supply those items. Typically, holding some quantities of a particular product "in stock" may enable a merchant to make such product available to customers in a more consistent fashion.

However, to maintain products in stock, a merchant may incur certain costs. Some of these costs may include, for example, real estate costs (e.g., lease costs, debt service, etc.), personnel costs, and facilities costs (e.g., utilities, maintenance, etc.). There may also be capital or economic costs related to the money that a merchant paid its vendor to obtain a stored product, which is then committed to inventory until payment for that product is received from a customer. Other types of costs may further include loss or damage due to accidents, or the like.

Balancing the benefits of keeping inventory with its associated costs often presents complex planning problems.

Figure 1:
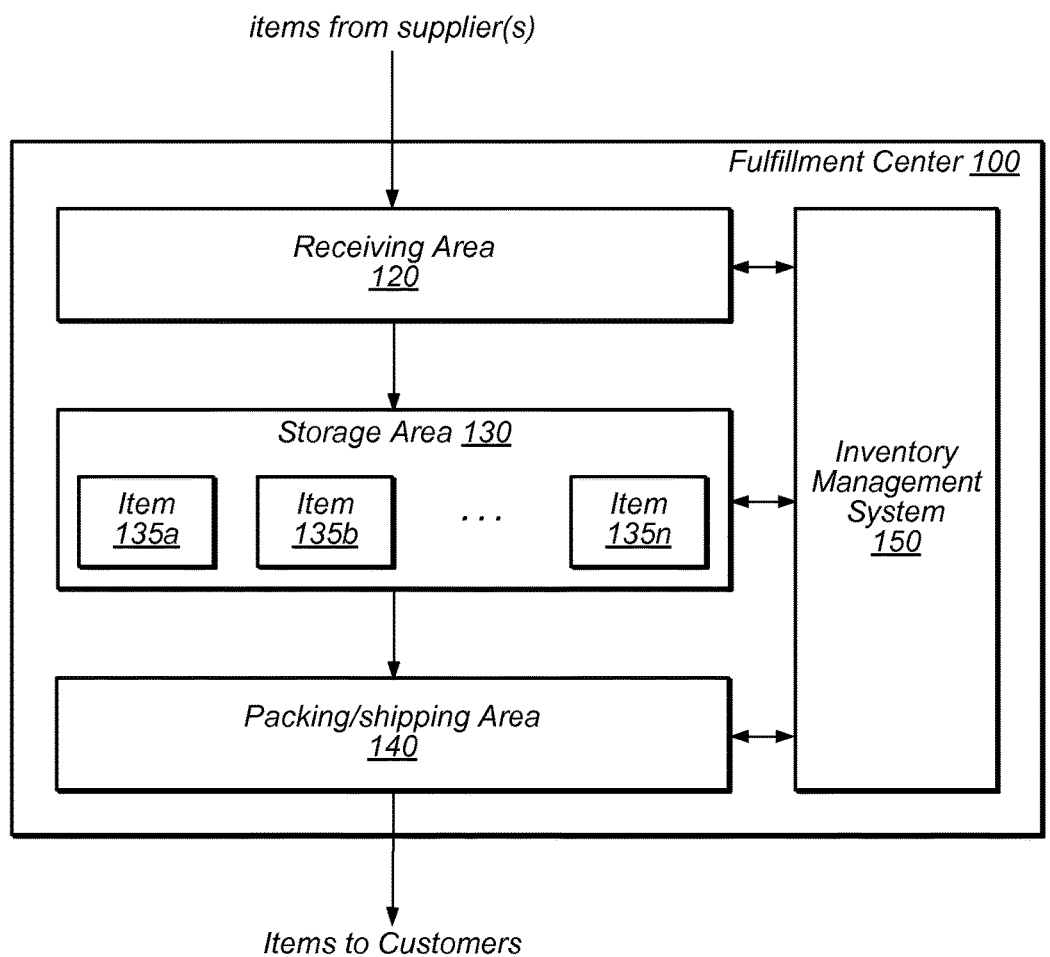
FIG. 1 is a block diagram of a fulfillment center according to some embodiments.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"First," "Second," etc. As used herein, these terms are used as labels for nouns that they precede, and do not imply any type of ordering (e.g., spatial, temporal, logical, etc.). For example, for a forecasting engine forecasting demand, the terms "first" and "second" clusters can be used to refer to any two clusters. In other words, the "first" and "second" clusters are not limited to logical clusters 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for demand forecasting are disclosed. Various ones of the present embodiments may include determining a demand pattern for each respective item of at least some of a plurality of items. Various embodiments may also include clustering the plurality of items into a plurality of clusters based on the determined demand patterns. In some embodiments, a composite demand pattern may be determined for each cluster and the demand of an item may be forecast based on the composite demand pattern of the cluster to which the item belongs. In some embodiments, the composite demand pattern may be refined prior to performing the demand forecast.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (e.g., "brick-and-mortar") store, through which customers may receive information about products and order or purchase those products in person.

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility such as, for example, warehouses, repositories, depositories, stockrooms, storehouses, distribution centers, material handling facilities, or the like.

In order to offer its customers a wider variety of items that are readily available for delivery, a merchant may store various quantities of such items within one or more fulfillment centers. An embodiment of one such fulfillment center is shown in FIG. 1. As illustrated, fulfillment center 100 includes receiving area 120, storage area 130 configured to store an arbitrary number of items or products 135*a-n*, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration, or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for shipment to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 100 often presents complex optimization issues. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

Demand Forecasting

Figure 2:
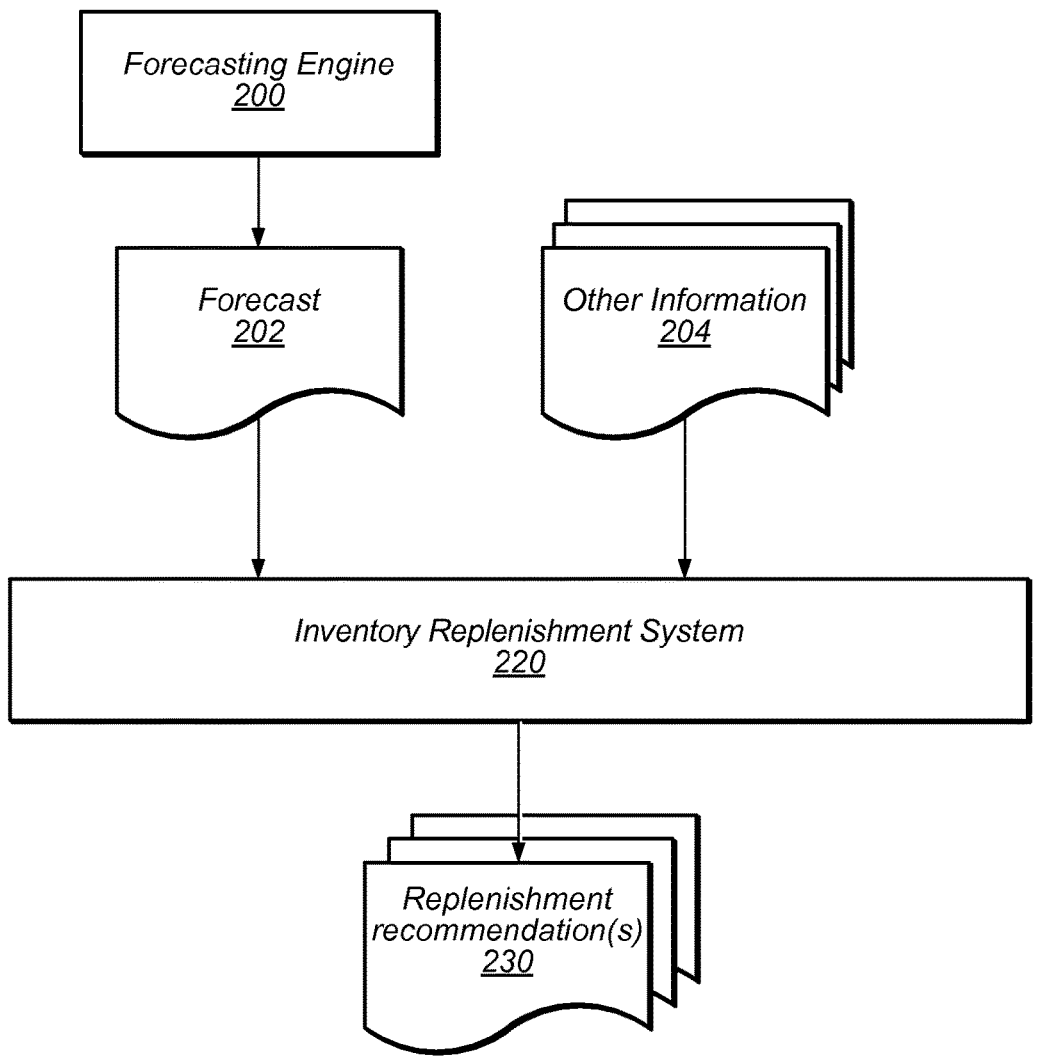
FIG. 2 is a block diagram of a system configured to generate a demand forecast, according to some embodiments.

FIG. 2 illustrates information flow in an inventory replenishment system according to various embodiments. Embodiments of inventory replenishment system 220 may generate replenishment recommendation 230 based at least in part on various data, including one or more of demand forecasts 202 (as described herein), or other information 204. Other information 204 may include unfilled order information, location information (e.g., replenishment lead time associated with shipping from a supplier), supplier information (e.g., supplier cost, replenishment lead time associated with item availability from a supplier), and/or stock information (e.g., current inventory).

Forecast 202 may be generated by forecasting engine 200. As described herein, forecasting engine 200 may be configured to determine a demand pattern for each respective item of at least some items of a plurality of items, cluster the plurality of items into a plurality of clusters based on the determined demand patterns, determine a composite demand pattern for each cluster of the plurality of clusters, and forecast a demand for an item of the plurality of items based on the composite demand pattern of the cluster to which the item belongs. The result of the forecast may be forecast 202. Also as described herein, the composite demand pattern for the clusters may be refined before the demand is forecast for the item such that the demand forecast is based on the refined composite demand pattern. Further as described herein, such determining a demand pattern, clustering items, determining a composite demand pattern, and refining the composite demand pattern may be performed for each one of one or more demand properties (e.g., seasonality, product life cycle, product birth effect, promotional effects, etc.). In various embodiments, forecast 202 may include forecasts or predictions of demand corresponding to one or more time periods. Although FIG. 2 illustrates using forecast 202 for inventory replenishment, it may also be used for other purposes, such as for pricing.

Replenishment recommendations 230 may indicate information such as, for example, items to be replenished, replenishment quantities for the items, locations to which the items are to be replenished, and particular sources within a distribution system from which the items are to be replenished.

Figure 3:
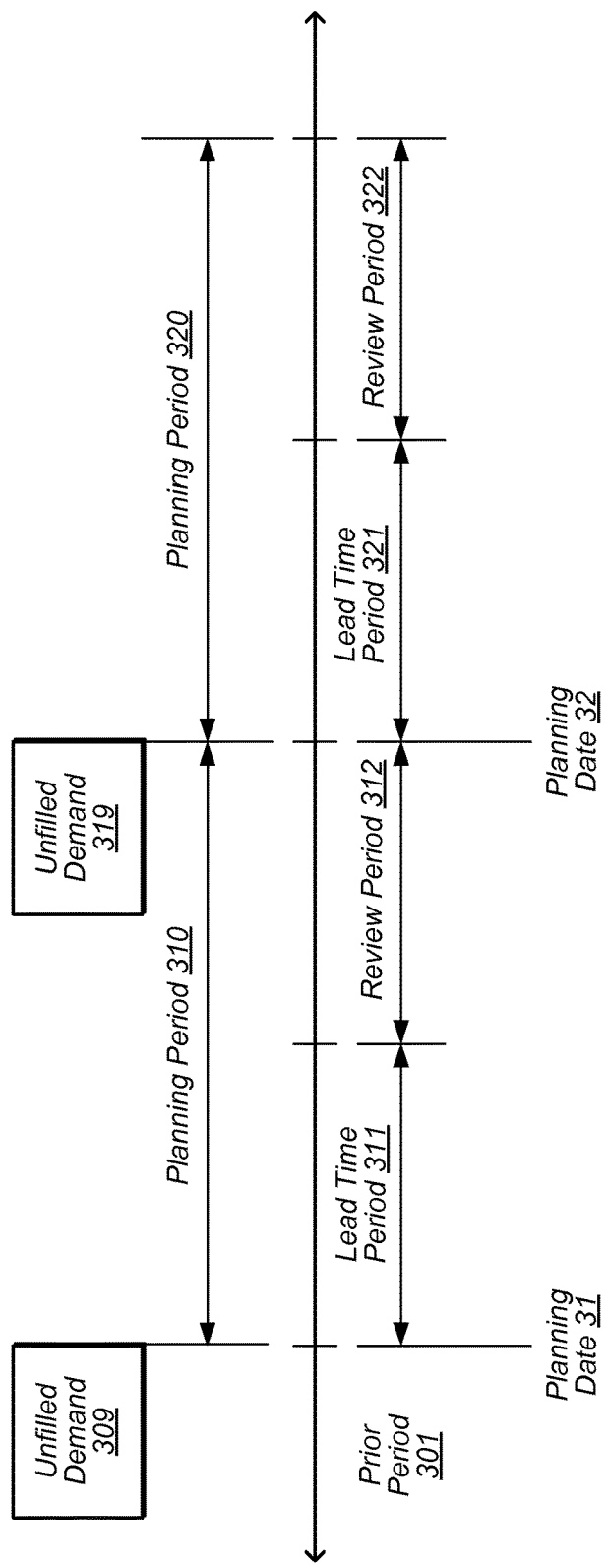
FIG. 3 depicts various exemplary time periods that may be associated with inventory planning as performed by some of the present embodiments.

As one example, an embodiment of inventory replenishment system 220 may generate replenishment recommendation 230 for a particular inventory item (e.g., one or more goods and/or services) based in part on forecast 202, which in some embodiments, may relate to an upcoming planning period. In various embodiments, forecast 202 and/or replenishment recommendation 230 may be specific to a particular one of a plurality of regional fulfillment centers having various regional forecasts for demand of the particular inventory item. Referring also to FIG. 3, the upcoming planning period may correspond to planning period 310 beginning at planning date 31 and ending at planning date 32. Planning period 310 may be subdivided for planning purposes into subset time periods, such as lead time period 311 and review period 312. Lead time period 311 may correspond to the total lead time associated with replenishing the inventory item, subsequent to the time that replenishment recommendation 230 is generated. For example, lead time period 311 may be based on a lead time associated with a supplier backlog of the inventory item and a lead time associated with delivery of the inventory item from the supplier to the inventory storage location (e.g., fulfillment center 100). Thus, lead time period 311 may correspond to the time from generations of replenishment recommendation 230 (planning date 31) until receipt of a corresponding replenishment supply. Similarly, lead time period 321 may correspond to a portion of planning period 320 between generation of a replenishment request at planning date 32 until receipt of a corresponding replenishment supply.

Continuing with the example of replenishment recommendation 230, review period 312 may correspond to the remaining portion of planning period 310, subsequent to lead time period 311. In other words, review period 312 may represent the time period after receipt of a replenishment supply requested at planning date 31, up to planning date 32 (which begins the next planning period). Thus, forecast 202 for planning period 310 may correspond to estimated customer demand for the inventory item during both lead time period 311 and review period 312. In some embodiments, inventory replenishment system 220 may separately generate forecasts for lead time period 311 and review period 312.

In particular embodiments, replenishment recommendation 230 may be further based on unfilled order information, which may include unfilled demand 309 at the time of planning date 31. For example, orders for the inventory item may have been accepted during prior period 301, but not yet fulfilled as of planning date 31 due to inventory shortages, logistics-related backlogs, or other reasons. Of these accepted but unfulfilled orders, unfilled demand 309 may correspond to the portion that has not yet been pulled from inventory as of planning date 31 (e.g., orders that are not work-in-progress, and not in transit). Thus, unfilled demand 309 may represent an existing commitment for the inventory item, originated prior to planning period 310, which will be satisfied from inventory (e.g., stock information 210) during planning period 310.

Therefore, inventory replenishment system 220 may generate replenishment recommendation 230 for planning period 310 that includes separate components respectively corresponding to unfilled demand 309, forecasted demand for lead time period 311, and forecasted demand for review period 312. Similarly, a replenishment recommendation corresponding to planning period 320, generated at planning date 32, may include portions corresponding to unfilled demand 319, lead time period 321, and review period 322. In some cases, it may be desirable to procure specific portions of the replenishment supply at an accelerated pace. For example, in instances where unfilled demand 309 is the result of inventory shortages, customer satisfaction may suffer if inventory replenishment cannot be accomplished in a timely manner. Therefore, if lead time period 311 is sufficiently long, accelerated shipping of supply to satisfy the inventory shortfall corresponding to unfilled demand 309 may be desirable. In some cases, drop shipping the item directly to the customer from the supplier may be appropriate. Similarly, if lead time period 311 is large and stock information 210 indicates that insufficient current inventory exists to meet estimated demand during lead time period 311, it may be desirable to arrange alternative arrangements to satisfy all or a portion of the estimated demand for lead time period 311 (e.g., accelerated supply to the fulfillment center, drop shipment to the customer).

In various embodiments, inventory management system 150, forecasting engine 200, and inventory replenishment system 220 may be implemented as respective dedicated computer systems, or they may be implemented as computer-executable instructions and data that may be executed by one or more computer systems (e.g., as described in greater detail below with respect to FIG. 7). Inventory management system 150, forecasting engine 200, and inventory replenishment system 220 are discussed and shown as separate systems in order to facilitate their description; however, in some embodiments, the functions of these systems may be integrated into and implemented by a single computer system or set of computer-executable instructions.

Figure 4:
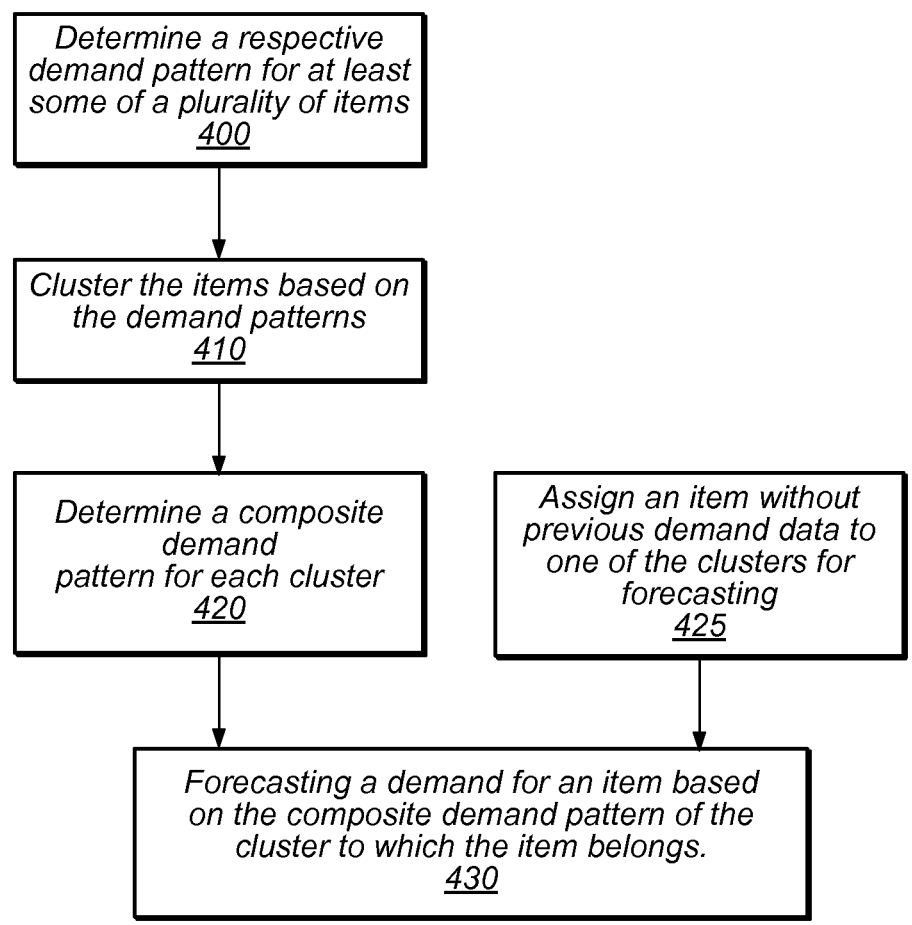
FIG. 4 is a flow diagram of forecasting demand, according to some embodiments.

Turning now to FIG. 4, one embodiment of a method for forecasting demand is depicted. While the blocks are shown in a particular order for ease of understanding, other orders may be used. In some embodiments, the method of FIG. 4 may include additional (or fewer) blocks than shown. Blocks 400-430 may be performed automatically or may receive user input. In one embodiment, forecast engine 200 may implement the method of FIG. 4.

At 400, a demand pattern may be determined for each respective item of at least some items of a plurality of items. The determined demand patterns may also be referred to as descriptors that correspond to the respective demand pattern. In one embodiment, the items may be for sale, such as products, goods, subscriptions, or services. For a given item, the demand pattern may be based on previous demand data for that given item. In some instances, one or more items may not have any previous demand data. For example a newly released item may not have any previous demand data. For items without previous demand data, a demand pattern may not be determined. As noted at 425, such items may be assigned to a cluster based on one or more item attributes and a demand forecast may be generated for such items.

In one embodiment, the plurality of items may belong to a common category of products. As examples, categories of products may include electronics, books, movies, kitchen, appliances, toys, etc. Thus, in one embodiment, the plurality of items may be electronics items such that the items for which a demand pattern is determined at 400 may be categorized as electronics items (e.g., cell phones, televisions, Blu-ray players, tablets, etc.). In other embodiments, the plurality of items may not belong to a common category of products such that an item from the book category and an item from the movie category may, in some instances, be clustered together at 410. For example, a holiday book and a holiday movie may have similar demand data over the course of a year (e.g., peak from late November to late December). Accordingly, in one embodiment, those items may be clustered together for a seasonality demand property, as described herein.

Figure 5:
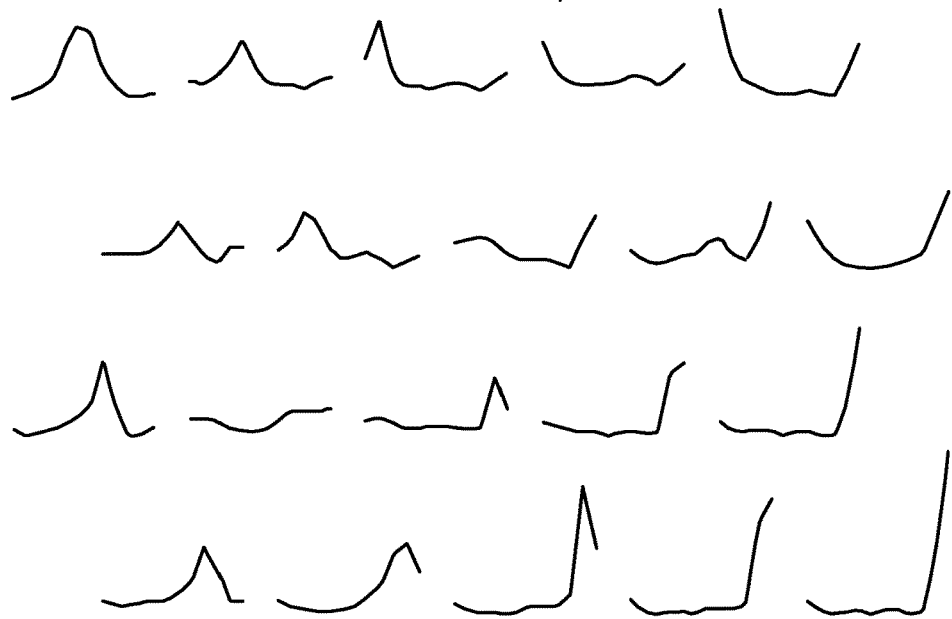
FIG. 5 is an example diagram of composite demand patterns for various clusters within a product group, according to some embodiments.
Figure 6:
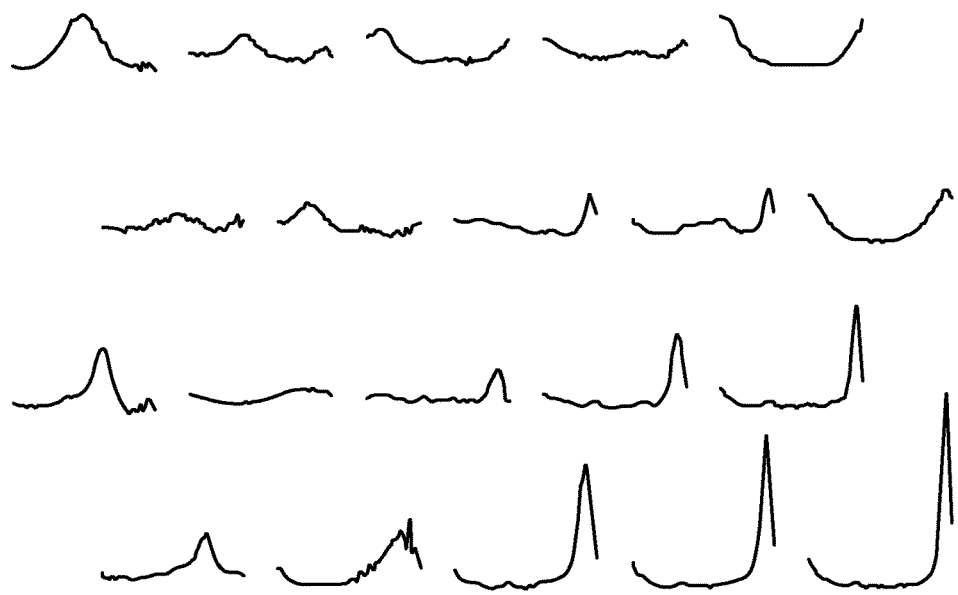
FIG. 6 is an example diagram of refined demand patterns for various clusters, according to some embodiments.

In some embodiments, determining the demand patterns may be performed separately for one or more demand properties. Demand properties may include seasonality in demand (e.g., higher demand in December, higher demand in summer/low demand in winter, etc.), lifecycle of a product, product birth effects, product death effect, pricing and promotional effects, availability effects, etc. As an example of separate performance of block 400 for one or more demand properties, consider a scenario in which two demand properties, seasonality and promotional effects, are being used in a system for forecasting demand. Determining demand patterns may be performed separately for each of the seasonality and promotional effects properties. Thus, item A may have a demand pattern corresponding to seasonality, and it may also have a demand pattern corresponding to promotional effects. For example, a demand pattern for seasonality may be represented by a line graph with respect to some time period (e.g., weekly, monthly, annually, etc.) as shown in FIGS. 5-6. A demand pattern for promotional effects may be represented by a line graph with demand on one axis and various promotions on the other axis.

Moreover, in determining an effect for a particular demand property, the demand data may be processed to remove or reduce effects of other demand properties. For example, if a product is newly released right before Christmas, some amount of product birth demand data may be due seasonality effects and the seasonality effects may be somewhat skewed by product birth effects. Accordingly, processing of the demand data based on expected effects of other properties may take place to provide a better estimate of demand patterns for a given property.

As illustrated at 410, the plurality of items may be clustered into clusters based on the demand patterns of block 400. For example, clustering may identify sets of similar patterns among the items and cluster the items accordingly. In some embodiments, the items may also be clustered based on attributes of the items. In one embodiment, clustering of an item into one of the clusters may be based on the determined demand pattern for that item and/or one or more attributes of the item. For example, the item may be a new item and may not have much previous demand data available. In such an example, clustering of the item may be based more on the item's attribute(s) than on previous demand data. Or, clustering of the item may be based entirely on the item's attribute(s). As noted at 425, for items without any previous demand data, those items may not actually participate in the clustering of block 410 but instead may be assigned to a cluster based on one or more attributes. In another example, an item may have a year's worth of demand data. In such an example, the determined demand pattern may be weighted more heavily than the item attribute to cluster the item into one of the clusters.

In one embodiment, clustering may be performed by a clustering algorithm, such as self-organizing maps (SOM), growing self-organizing maps (GSOM), or some other clustering algorithm. In other embodiments, clustering may be performed by other grouping methods. The clustering algorithm may receive as input the appropriate number of clusters and/or threshold values for clustering in a given cluster. In some embodiments, given the demand patterns, the clustering algorithm may automatically determine the appropriate number of clusters and threshold values that determine which cluster to assign an item to.

In some embodiments, clustering the items may be performed separately for one or more demand properties. Separate performance of the clustering of the items for one or more demand properties may result in one or more clusters with corresponding demand patterns for a given item. Continuing the two demand property example from above, clustering the items at block 410 may be performed separately for each of the seasonality and promotional effects properties. Separate clustering may result in item A being clustered into a cluster for seasonality and into a cluster for promotional effects.

As shown at 420, a composite demand pattern may be determined for each cluster. In one embodiment, the composite demand pattern for a cluster may be an average of at least some of the demand patterns for the items that make up that cluster. In other embodiments, other methods may be used to determine the composite demand pattern for the cluster, such as a median demand pattern, a weighted average based on the strength of the underlying demand patterns (e.g., a demand pattern based on several years of demand data may be weighted more than a demand pattern based on two months of demand data), or by averaging a portion (e.g., the middle 50%) of the individual demand patterns, among other techniques.

In some embodiments, the composite demand pattern for each cluster may be refined. Consider a seasonality example in which the composite demand pattern has a monthly resolution (e.g., a 12-dimensional vector with each value representing a month of the year). Refining the composite demand pattern may, in one embodiment, include determining the average demand for each item within a cluster at a smaller time interval (e.g., weekly, daily, hourly, etc.) than the time interval used (e.g., monthly) in the composite demand pattern. Continuing the example, the finer resolution average demands for each item may be processed to find a refined composite demand pattern. In one embodiment, processing of the finer resolution average demands for each item may be performed according to a Gaussian Process Model. In such an embodiment, one of the components of the Gaussian Process Model may relate to seasonality. Example composite demand patterns for various clusters and corresponding refined versions is illustrated in FIGS. 5 and 6, respectively.

In various embodiments, determining the composite demand pattern (including refinement, if any) at 420 may be performed separately for one or more demand properties. Separate performance of determining the composite demand pattern for the one or more demand properties may result in one or more clusters with corresponding composite demand patterns for a given item. Continuing the two property example from above, composite demand patterns (and refined composite demand patterns) may be determined for each of the seasonality clusters and for each of the promotional effects clusters. The various composite demand patterns may then be used at 430 to forecast demand.

As shown at 425, one or more items may not have previous demand data. Such items may be assigned to a cluster based on one or more attributes. Demand may then be forecasted for those items based on the composite demand pattern of the cluster to which the item(s) has been assigned. For example, consider a new product newX for which no demand data exists. Based on one or more attributes, newX may be assigned to a cluster C1. For instance, newX may be the new top of the line television by manufacturer X that replaces the previous year's model. newX may share one or more attributes with the previous model such that it is assigned to the same cluster to which the previous model has been clustered, C1 in this example. Demand may then be forecasted for newX based on the composite demand pattern for the cluster C1.

At 430, a demand for an item may be forecasted. Forecasting the demand may be based on the composite demand pattern of the cluster to which the item belongs (e.g., has been clustered into or assigned into). In some embodiments, the demand may be forecasted based on the refined composite demand pattern of the cluster to which the item belongs. As one example, consider a scenario in which a single demand property, seasonality, is used for demand forecasting. In such an example, forecasting the demand for the item may be based on the composite demand pattern (and/or refined composite demand pattern) of the seasonality cluster.

In various embodiments, forecasting demand may be based on composite demand patterns for more than one demand property. Continuing the two property example above in which seasonality and promotional effects properties were used, a respective composite demand pattern, which may be refined, may be produced for the various clusters of each of the seasonality and promotional effects properties. Accordingly, forecasting the demand for an item may be based on composite demand patterns of one or more of the clusters to which the item belongs. Thus, if item A belongs to cluster Seasonality1 and to cluster PromotionalEffects3, then the demand forecast for item A may be based on the composite demand patterns for Seasonality1 and PromotionalEffects3, respectively. In one embodiment, one or more of the composite demand patterns may be weighted more heavily than the other. Thus, if seasonality is deemed more important than promotional effects, then the seasonality composite demand pattern may be weighted more heavily than the promotional effects composite demand pattern. In other embodiments, the various composite demand patterns may be weighted equally.

In various embodiments, one item of the plurality of items may be clustered into a common cluster with another item for one of the demand properties but may be clustered into a different cluster than the other item for another demand property. As a simple example, item A may belong to clusters Seasonality1 and PromotionalEffects3, whereas item B may belong to clusters Seasonality1 and PromotionalEffects4. In such an example, items A and B may have similar seasonality demand patterns but different promotional effects demand patterns.

In one embodiment, based on the forecasted demand, a quantity of the item to replenish its inventory may be determined. Or, in other embodiments, a pricing of the item may be determined based on the forecasted demand.

The techniques disclosed herein may leverage similar demand patterns within a cluster of items to improve demand forecasting. Accordingly, improved demand forecasting may result in improved pricing and inventory planning.

FIGS. 5 and 6 present graphs illustrating examples of composite demand patterns and refined demand patterns for the seasonality property, respectively. In these examples for seasonality, the horizontal axis may be time (e.g., January at the left most, December at the right most) whereas the vertical axis may represent demand. The demand represented by the vertical axis may be a percentage or it may be a raw value of demand. For other properties, the horizontal axis may represent something other than time, for example, a promotion (e.g., 10% off, 15% off, buy one get one free, etc.).

In the examples of FIG. 5, demand patterns for twenty clusters for a product group are shown for seasonality. Note that the clustering of block 410 of FIG. 4 may result in any number of clusters. Each of the demand patterns in FIG. 5 may be a twelve-dimensional vector, with each dimension representing a month of the year. Taking the first demand pattern graph (first graph in the top row), a composite demand pattern for a cluster is shown. The first demand pattern graph may represent an item that has more demand in the summer. Such items could be swimsuits, swim gear (e.g., goggles, snorkels, etc.), beach towels, sunscreen, air conditioners, popsicles, etc. In contrast, the last demand pattern in the second row may represent items that have more demand in the winter months, such as holiday decorations, holiday lights, coats and jackets, sweaters, snow shovels, snow plows, etc. As yet another example, the last demand pattern graph (right-most in the bottom row) may represent a cluster of items that mostly have demand at the end of the year. Such items may include Christmas socks or ties, Christmas trees, etc. As noted above, the demand patterns of FIG. 5 represent the composite demand for the various clusters. Thus, items of a given cluster may not have a demand pattern that looks exactly like the composite demand pattern but instead, may have a similar demand pattern. In some embodiments, an item's individual demand pattern may be more similar to the composite demand pattern of the cluster to which the item belongs than it is to other composite demand patterns of other clusters. FIG. 6 illustrates refined composite demand patterns of the composite demand patterns of FIG. 5. Note the higher resolution and granularity in the refined demand patterns of FIG. 6, which corresponds to weekly demand patterns in FIG. 6 versus monthly demand patterns in FIG. 5.

Figure 7:
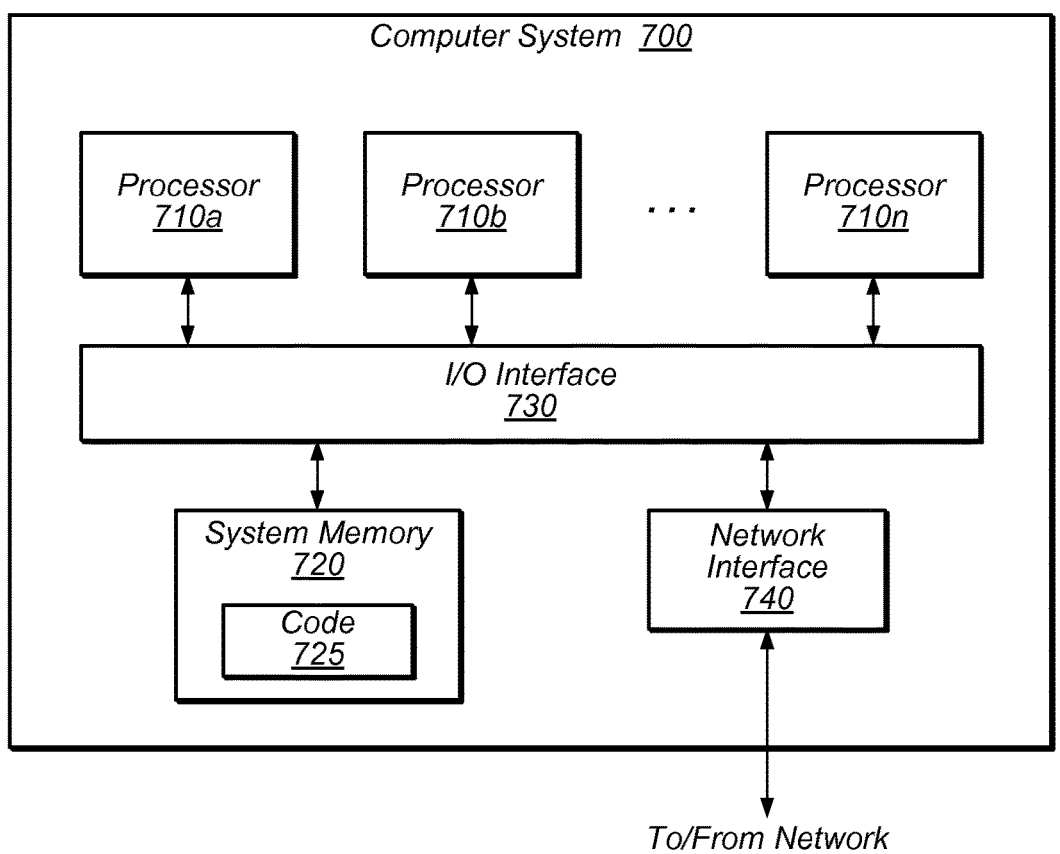
FIG. 7 is a block diagram illustrating a computer system configured to implement demand forecasting, according to some embodiments.

An embodiment of a computer system including computer-accessible media is illustrated in FIG. 7. As illustrated, computer system 700 includes one or more processors 710 coupled to a system memory 720 via an input/output (I/O) interface 730. Computer system 700 further includes a network interface 740 coupled to I/O interface 730. In some embodiments, forecast engine 200 may be implemented using a single instance of computer system 700, while in other embodiments multiple such systems may be configured to host different portions or instances of a forecast engine. Moreover, in some embodiments, some data sources or services (e.g., purchasing management services) may be implemented via instances of computer system 700 that are distinct from those instances implementing other data sources or services (e.g., order entry).

In various embodiments computer system 700 may be a single processor system including one processor 710, or a multiprocessor system including several processors 710 (e.g., two, four, eight, or another suitable number). Processors 710 may be any suitable processor capable of executing instructions. For example, in various embodiments, processors 710 may be a general-purpose or embedded processor implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by process 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as code 725.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media—e.g., disk or CD/DVD-ROM coupled to computer system 700 via I/O interface 730. A computer-accessible medium may also include any volatile or non-volatile media such as RAM (e.g., SDRAM, DDR SDRAM, RDRAM, SRAM, etc.), ROM, etc., that may be included in some embodiments of computer system 700 as system memory 720 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
   a memory; and
   one or more processors coupled to the memory, wherein the memory comprises program instructions executable by the one or more processors to:
      for each of two or more respective demand properties:
         determine, for the respective demand property, a plurality of demand patterns for a plurality of products offered for sale,
         cluster each of the plurality of products into one or more of a plurality of clusters based on similarities among the determined plurality of demand patterns,
         determine, for the respective demand property, an average demand pattern for each cluster of the plurality of clusters, and
         refine each cluster's average demand pattern for the respective demand property;
      wherein a product of the plurality of products belongs to each of two or more clusters, each cluster corresponding to a respective one of the two or more demand properties;
      forecast a demand for the product based on the refined average demand patterns of each of the two or more clusters corresponding to respective demand properties;
      determine a quantity of the product to replenish the product's inventory based on the forecasted demand; and
      instruct replenishment of the product based at least in part on the determined quantity of the product; and
   one or more fulfillment centers that physically receive the determined quantity of the product to replenish inventory, wherein physical receipt of the determined quantity of product causes more consistent availability of the inventory of the one or more fulfillment centers which is due in part to said forecast the demand for the product based on the refined average demand patterns of clusters corresponding to the respective demand properties.

2. The system of claim 1, wherein said determine the plurality of demand patterns includes determine a respective demand pattern, for at least some products of the plurality of products, based on previous demand data for the at least some products.

3. The system of claim 1, wherein said cluster each of the plurality of products is further based on one or more attributes of the product.

4. A method, comprising:
   performing, by one or more computers:
      for each of two or more respective demand properties:
         determining, for the respective demand property, a demand pattern for each respective item of at least some items of a plurality of items;
         clustering each of the plurality of items into one or more of a plurality of clusters based on similarities among the determined demand patterns;
         determining, for the respective demand property, a composite demand pattern for each cluster of the plurality of clusters; and
         refining at least one cluster's respective composite demand pattern for the respective demand property;
      wherein an item of the plurality of items belongs to each of two or more clusters, each cluster corresponding to a respective one of the two or more demand properties;
      forecasting a demand for an item of the plurality of items based on the refined composite demand patterns of each of the two or more clusters that correspond to respective demand properties; and
      instructing supply of the item based at least in part on the forecasted demand for the item; and
   physically receiving the instructed supply of the item, wherein an amount of the received supply of the item:
      is based at least in part on the refined composite demand patterns of the clusters corresponding to the respective demand properties used in said forecasting the demand, and
      causes more consistent availability of the item at a fulfillment center.

5. The method of claim 4, wherein the plurality of items belong to a common category of items.

6. The method of claim 4, wherein the two or more demand properties include a seasonality property, and wherein the forecasted demand is based at least in part on the composite demand pattern of the item's cluster for the seasonality property.

7. The method of claim 4, wherein one item of the plurality of items is in a common cluster with another item for one of the two or more demand properties, and wherein the one item is in a different cluster than the other item for another of the two or more demand properties.

8. The method of claim 4, wherein said determining the demand pattern for each respective item is based on respective previous demand data for the at least some items.

9. The method of claim 4, wherein said clustering each of the plurality of items is further based on one or more attributes of the plurality of items.

10. The method of claim 4, wherein at least one item of the plurality of items is an item without previous demand data, the method further comprising assigning the at least one item to one of the clusters based on an attribute of the at least one item, wherein forecasting demand for the at least one item is based on the composite demand pattern of the one cluster.

11. The method of claim 4, wherein the two or more demand properties include at least one demand property selected from lifecycle of an item, item birth effect, product death effect, pricing effect, promotional effect or availability effect.

12. A non-transitory computer-readable storage medium storing program instructions, wherein the program instructions are computer-executable to implement:

for each of two or more respective demand properties:
  determining, for the respective demand property, and for at least some items of a plurality of items, a respective demand pattern for each of the at least some items;
  grouping each of the plurality of items into one or more of a plurality of groups based on similarities among the determined respective demand patterns;
  determining, for the respective demand property, a group demand pattern for each group of the plurality of groups; and
  refining each group's group demand pattern for the respective demand property;
wherein an item of the plurality of items belongs to each of two or more groups, each group corresponding to a respective one of the two or more demand properties;
forecasting a demand for an item of the plurality of items based on the refined group demand patterns of each of the two or more groups corresponding to respective demand properties; and
transmitting, over a network, instructions instructing supply of the item based at least in part on the forecasted demand for the item such that the supply of the item is physically received, wherein physical receipt of the supply of the item causes more consistent availability of the item at one or more fulfillment centers, due in part to said forecasting the demand for the item based on the refined group demand patterns corresponding to the respective demand properties.

13. The non-transitory computer-readable storage medium of claim 12, wherein said determining the respective demand patterns is based on respective previous demand data for the at least some items.

14. The non-transitory computer-readable storage medium of claim 12, wherein said grouping each of the plurality of items is further based on one or more attributes of the plurality of items.

15. The non-transitory computer-readable storage medium of claim 12, wherein said refining includes processing the composite demand pattern with a Gaussian Process Model.

* * * * *